United States Patent

[11] 3,587,289

| [72] | Inventor | John L. Plummer |
| | | Wynnewood, Pa. |
| [21] | Appl. No. | 838,883 |
| [22] | Filed | July 3, 1969 |
| [45] | Patented | June 28, 1971 |
| [73] | Assignee | Plummer & Kershaw, |
| | | East Greenwich, Pa. |

[54] OPTICAL MICROMETER
3 Claims, 4 Drawing Figs.

[52] U.S. Cl............................................... 73/1 DV,
356/156
[51] Int. Cl........................................................ G01b 11/00,
G01p 21/00
[50] Field of Search............................................ 73/1 (A), 1
(DV); 356/156, (Inquired)

[56] References Cited
UNITED STATES PATENTS
1,891,196  12/1932  Aldeborgh et al. .............. 33/172

2,363,964  11/1944  Howson et al. ................ 356/17
3,019,708  2/1962  French et al. .................. 356/156X
FOREIGN PATENTS
409,808  2/1925  Germany...................... 356/156

Primary Examiner—S. Clement Swisher
Attorney—Paul and Paul

ABSTRACT: An optical device is disclosed for calibrating measuring instruments. The device may be used, for example, to calibrate electronic instruments for measuring vibrations of a physical body. The device includes a pair of reflecting surfaces, which may be a pair of triangular prisms, one of which is fixed mounted and the other which is adjustably movable relative to the first for producing displacement of the image, thereby to simulate displacement of a fixed target. A dial gauge provides a precise indication of the displacement of the second reflecting surface, thereby providing a precise and accurate indication of the simulated displacement of the target.

PATENTED JUN28 1971

INVENTOR.
John L. Plummer

BY

Paul & Paul
ATTORNEYS.

INVENTOR.
John L. Plummer
BY
Paul + Paul
ATTORNEYS.

OPTICAL MICROMETER

FIELD OF THE INVENTION

This invention lies in the field of measuring devices, particularly devices for calibrating measuring instruments.

BACKGROUND OF THE INVENTION

In prior art devices of the type here involved, the gear, screw, or other drive which moves or displaces the light refractory body also drives the gauge pointer. Thus, any play or backlash in the gear or screw or other drive affects the positioning of the gauge pointer. Such prior art devices are not capable of meeting fine tolerances and are not satisfactory for precision work.

SUMMARY OF THE INVENTION

According to the present invention, the primary indicator pointer is driven by the displaceable light reflecting body itself, as distinguished from being driven by the gearing which causes displacement of the light reflecting body. In a preferred form, a pair of triangular prisms are employed as the reflecting bodies, one fixed and the other adjustable. Movement of the adjustable prism drives the primary indicator pointer directly. The device is capable of precision displacement and precise measurement of the displacement.

BRIEF DESCRIPTION OF THE DRAWING

In the drawings:

In FIG. 4, the upper housing 14 is tilted relative to the base housing 12 so as to reveal more clearly what is contained in the upper housing.

DESCRIPTION OF THE PREFERRED EMBODIMENT

Figure 2:
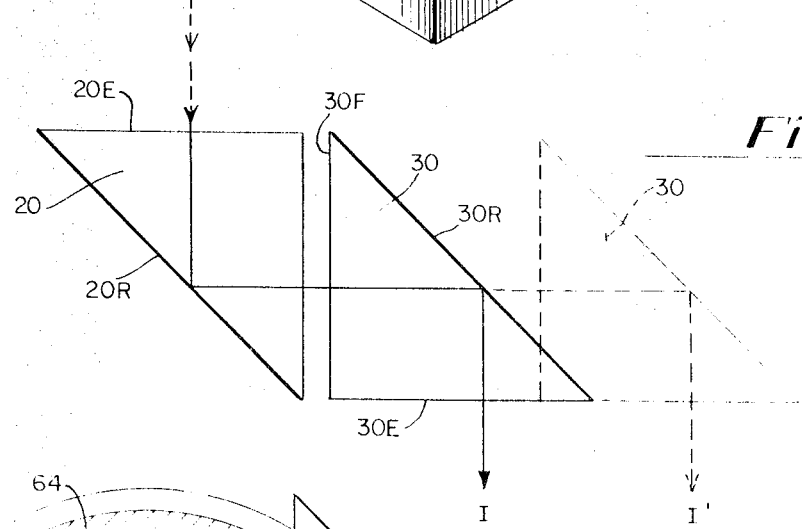
FIG. 2 is a diagrammatic representation of the light path.
Figure 3:
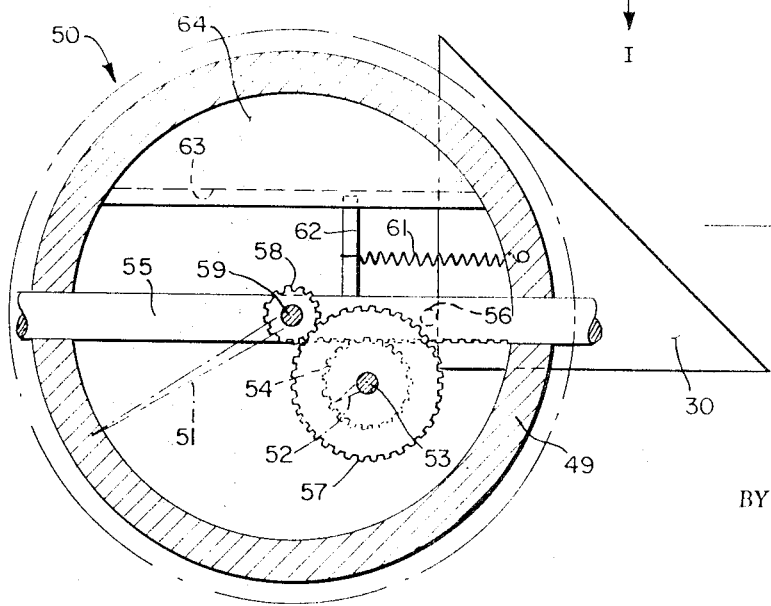
FIG. 3 is a plan view of the means by which the pointers of the dial gauge are driven.

Referring first to FIG. 2, there is shown diagrammatically the light path from a target T through first and second triangular prisms 20 and 30 to the image I or I'. The hypotenuse surfaces 20R and 30R of the first and second prisms 20 and 30, respectively, are very accurately ground highly polished mirror surfaces which reflect the light wave through an angle of 90°. Thus, the light rays from the target T enter the entrance prism 20 through the entrance pupil 20E, are bent 90° by the reflecting surface 20R, enter the exit prism 30, are bent 90° by the reflecting surface 30R, and exit through the exit pupil 30E along a line which is parallel to, but laterally displaced from, the path of the rays from the target T to the entrance pupil 20E. The exit prism 30 is adjustably movable, by means to be described, along a lateral path relative to the entrance prism 20, as is indicated in FIG. 2 by the dotted line position of the exit prism. The image is thereby displaced from the position I to the limit position I', or to any position therebetween.

In order for the optical micrometer of the present invention to function as a precision instrument for simulating vibratory or other movement of a target T, it is necessary that the distance through which the exit prism 30 is moved be accurately indicated on an indicator instrument. The means for achieving such a precision indication of the lateral displacement of the exit prism 30, relative to the fixed prism 20, will now be described.

Figure 1:
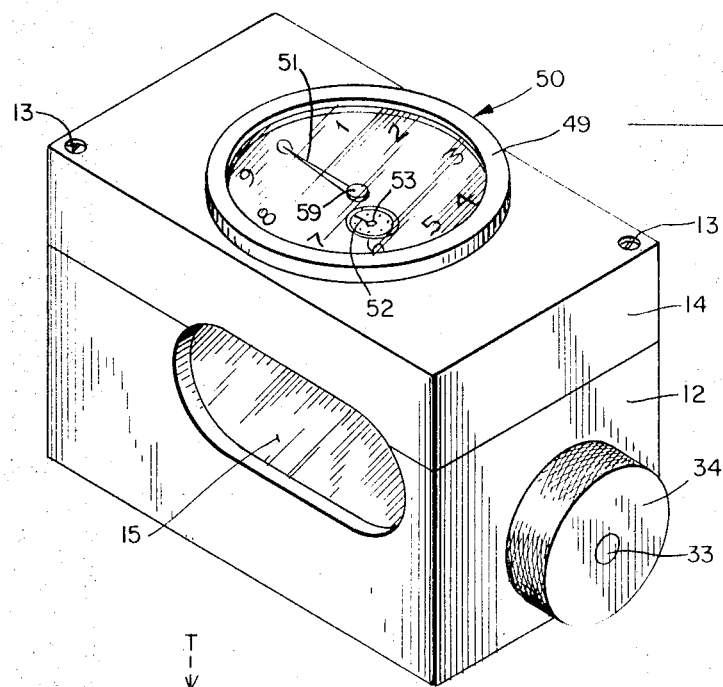
FIG. 1 is a perspective illustration of the optical micrometer.

As illustrated in FIG. 1, the optical micrometer of the present invention may include a viewer housing having a base portion 12 and an upper portion 14 held together as by elongated screws 13 or by any other suitable means. The dial gauge 50 is supported in the upper housing 14. An elongated image-viewing window 15 is provided to allow for transverse displacement of the exit prism 30. The target window 16 may be circular.

Figure 4:
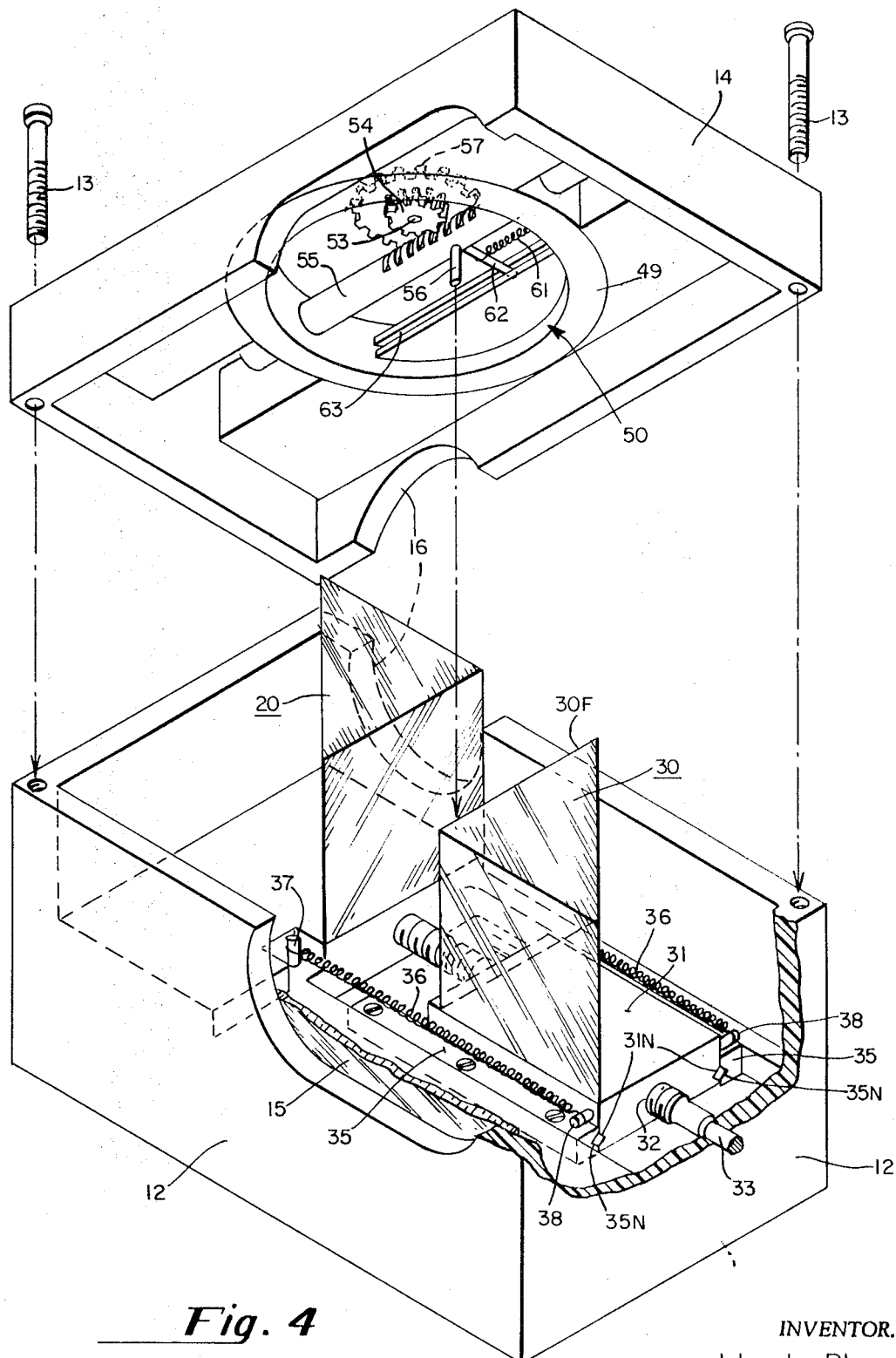
FIG. 4 is an exploded view showing the interior mechanism of the optical micrometer.

Referring now to FIG. 4, fixed mounted on a support shelf in the base portion 12 is an entrance prism 20 of triangular configuration having an entrance pupil or face 20E positioned at the target window 16 and an accurately ground highly polished mirror surface 20R disposed at an angle of 45° relative to the entrance pupil 20E.

Also mounted in the base portion 12 but mounted on a carriage 31 for adjustable movement laterally away from or toward the fixed entrance prism 20, is an exit prism 30 having an accurately ground highly polished mirror reflecting surface 30R disposed at an angle of 45° relative to the exit pupil 30E. The exit pupil faces the image-viewing window 15.

The exit prism 30 is mounted on and secured as by epoxy cement to the carriage 31 having therethrough a transverse hole 32, and aligned therewith at a central portion thereof a threaded nut (not seen) through which passes an elongated threaded adjustment screw 33 having at each end thereof an adjustment knob 34. The threaded screw 33 is characterized by having a very fine lead, thereby to permit very small linear movements of the carriage 31. The transverse hole 32 is, of course, of a diameter sufficiently large to receive the screw 33 with suitable clearance.

To provide accurate guidance for the movement of the carriage 31, there is fixed mounted in the base housing 12, on each side of the carriage 31, an accurately machined linear bearing guide 35 having a V-notch 35N for receiving a series of ball bearings (not seen). The carriage 31 is provided, on each side, with a corresponding V-notch 31N for receiving the other half portions of the ball bearings. A retainer (not seen) is disposed between the carriage 31 and the bearing guide 35.

The carriage 31 on which the exit prism 30 is mounted is preloaded (in a direction toward the fixed entrance prism 20) by a pair of tension springs 36, one end of each of which is fixed to a post 37 in the base housing 12 and the other end of each of which is secured to a pin 38 which projects from the carriage 31. The function of the tension springs 36 is to maintain the threads of the screw 33 up against the threads of the nut in the hole 32 so as to eliminate play or backlash.

Mounted in the upper housing 14 is a dial gauge 50 having a ring frame 49 for supporting the dial mechanism. The dial includes a unit pointer 51 and a directly driven tens pointer 52. The drive gearing is such that the tens pointer 52 moves one-tenth of a revolution for each complete revolution of the unit pointer 51.

The tens pointer 52 is keyed or otherwise fixed to a vertically disposed stub shaft 53 which is supported in a suitable bearing and which projects above the surface of the upper housing 14. A pinion 54 is fixed on shaft 53 within the housing 14. Pinion 54 is in engagement with a rack 55 which is supported at each end in a bearing in the ring frame 49. Rack 55 carries a depending pushpin 56 which projects down into the path of the exit prism 30. Thus, when adjusting knob 34 is rotated to move the exit prism 30 toward the entrance prism 20, the depending pushpin 56 is engaged by the face 30F of the exit prism 30 and the pin is moved along with the prism. MOvement of pin 56 moves the rack 55 to which it is fixed, thereby rotating the rack pinion 54 and thereby rotating the tens pointer 52.

Also keyed to stub shaft 53 is a gear 57 which drives a pinion 58 keyed to the unit pointer shaft 59. Thus, rotation of the tens pinion 54 in response to lateral movement of rack 55 also causes rotation of the unit pointer 59 through the gear train 54, 57 and 58.

Rack 55 is spring-loaded in a direction away from the entrance prism 20 as by a tension spring 61. One end of spring 61 is secured to the dial ring 49 and the other end is secured to a transverse bar 62. One end of bar 62 is secured to rack 55. The other end is received within a guide groove 63 in a plate 64 secured to the dial ring 49. Thus, when the knob 34 is turned in a direction to move the exit prism 30 away from the entrance prism 20, the depending pushpin 56 follows the movement of the exit prism 30.

As a result of the construction shown and described, the pointer movements are free and independent of an backlash or play which may be present in the drive means which move the exit prism 30. Thus, the pointers provide an accurate indication of the displacement of the exit prism.

While the optical micrometer shown and described in the present application is adapted for other uses, one use is in connection with a target displacement detector made and sold by Physitech, Inc., Willow Grove, Pa. This target displacement detector is an electronic device for detecting and measuring small amplitude high speed displacement, as for example, vibration of a physical body. An image dissector or other camera tube is focused on the optical discontinuity between dark and bright portions of the body whose vibration is to be detected. Deflection signals are applied to the camera tube to scan the image across the aperture at a rate which is high relative to the expected rate of vibrations of the body, and the value of the deflection signal is measured at the instant the optical discontinuity crosses the aperture. From this instantaneous measurement of the deflection signal, an information signal is derived which is indicative of the position of the image at that instant.

The optical micrometer shown and described in the present application is useful in calibrating the aforesaid electronic target displacement detector. Calibration is accomplished by physically mounting the optical micrometer on the front of the image dissector tube so that the optical micrometer is between the target and the light sensitive screen of the tube. The optical micrometer of the present invention is then employed to simulate displacement of the target by a distance equal to that of the maximum expected departure of the target during its expected high speed vibrations. In this manner, the electronic target displacement detector is calibrated. The device is designed to provide an accuracy of one-thousandths of an inch.

I claim:

1. Apparatus for calibrating a measuring instrument, said apparatus comprising:
   a. an entrance reflector fixed mounted for receiving light rays from a fixed target;
   b. an exit reflector for receiving light rays reflected from said entrance reflector and for reflecting said rays to an image position;
   c. means for adjusting the position of said exit reflector relative to said entrance reflector for simulating displacement of said fixed target;
   d. a visual indicating gauge;
   e. means for driving said indicating gauge directly from said exit reflector as said exit reflector is adjustably moved, for providing a linear visual indication of the simulated displacement of said fixed target;
   f. said visual indicating gauge being a dial having a rotatable pointer;
   g. said means for driving said pointer including:
      g-1. a rotatable shaft on which said pointer is fixed mounted,
      g-2. a pinion fixed to said shaft,
      g-3. a rack engaging said pinion,
      g-4. means coupling said rack to said exit reflector for moving said rack only when said exit reflector is moved,
      g-5. said means coupling said rack to said exit reflector including a pushpin projecting from said rack and engaging said exit reflector;
   h. spring means for preloading said rack in one direction for maintaining said pushpin in engagement with said exit reflector whereby when said exit reflector moves in one direction said reflector pushes said pin, and when said exit reflector moves in the opposite direction said pushpin follows said reflector;
   i. said means for adjusting the position of said exit reflector including;
      i-1. a carriage on which said exit reflector is mounted,
      i-2. threaded means on said carriage,
      i-3. an adjusting screw in said threaded means,
      i-4. means for manually rotating said adjusting screw,
   j. guide bearings for guiding the movement of said exit reflector carriage;
   k. spring means for preloading said exit reflector carriage for maintaining said carriage in firm engagement with the threads of said adjusting screw;
   l. a viewer housing having an entrance aperture and an exit aperture;
      l-1. said entrance reflector being fixed mounted in said housing for receiving light rays passing from the target through said entrance aperture, and
      l-2. said exit reflector being adjustably mounted for receiving light rays from said entrance reflector and for reflecting said rays through said exit aperture.

2. Apparatus according to claim 1 characterized in that said exit aperture is an elongated aperture to accommodate for the movement of said exit reflector.

3. Apparatus according to claim 2 characterized in that said entrance and exit reflectors are prisms each having an accurately ground highly polished reflecting surface for receiving the target rays and for reflecting the target rays to the image position.